Patented July 31, 1951

2,562,222

UNITED STATES PATENT OFFICE 2,562,222

SPLITTING OF SULFONAMIDES

David I. Weisblat, Barney J. Magerlein, and Donald R. Myers, Kalamazoo, Mich., assignors to The Upjohn Company, Kalamazoo, Mich., a corporation of Michigan No Drawing. Application July 31, 1948, Serial No. 41,883

16 Claims. (Cl. 260—251.5)

The present invention relates to a method for splitting a sulfonyl derivative of an amine to recover the amine therefrom, particularly to a method for splitting or cleaving an arylsulfonamide having one aryl substituent on the amido nitrogen atom with hydrogen bromide to recover the amine in unbrominated form.

It is common practice in organic chemistry to protect a primary or secondary amino group in an organic compound by replacing a hydrogen atom bonded to the nitrogen with an easily removable organic radical. This procedure is often followed to enable a reaction involving the compound to be carried out without danger of the formation of undesirable by-products or decomposition products which would otherwise be formed if the amino group were not protected. Subsequently, the protecting organic radical is removed from the molecule and the desired reaction product of the amine thus obtained. Many types of protective groups have been employed, the most usual probably being the sulfonyl radicals, particularly the arylsulfonyl radicals. The importance of the sulfonyl radicals for this purpose is due principally to the availability and low cost of the sulfonyl halides from which they are generally prepared, and to the ease of formation of the sulfonyl derivatives of primary and secondary amines. Sulfonyl derivatives of a wide variety of primary and secondary amines can be submitted to reactions which are not possible with the free amine without major decomposition, and the reacted amine then recovered in high yield by splitting the sulfonyl radical from the molecule. The sulfonyl derivative of primary amines contain an active hydrogen on the amido nitrogen and this hydrogen can be replaced readily with many different kinds of substituent groups to form the sulfonyl derivative of a secondary amine which can then be decomposed by splitting the sulfonyl radical from the compound to recover the secondary amine uncontaminated with a primary or tertiary amine.

The splitting of a sulfonyl derivative of an amine in which the nitrogen is bonded to a benzene nucleus of an aromatic radical has, however, presented considerable difficulty. Although such compounds can be hydrolyzed with an alkali to split the sulfonyl radical from the molecule, the process is often not satisfactory because the amine which is formed is frequently subject either to oxidation or to other forms of decomposition in strongly alkaline media. Ester groups, for example, which may be present in the molecule are invariably hydrolyzed to carboxyl groups by this procedure and this is often undesirable.

Aqueous hydrogen halides, generally aqueous hydrogen chloride, has also been used extensively, but the prolonged heating or refluxing of the reaction mixture which is usually necessary frequently leads to decomposition of valuable products or to side reactions involving other portions of the molecule, particularly when other reactive groups are present in the molecule, due to the high temperature necessary and to the strong hydrolytic conditions prevailing in the mixture. Procedures involving heating an arylsulfonamide with an aqueous halide are limited to the cleaving of arylsulfonamides devoid of many types of reactive groups.

It has also been proposed to carry out the cleavage of arylsulfonamides in a substantially anhydrous medium, such as acetic acid, utilizing a hydrogen halide as the splitting agent. This procedure has the advantage that it can be carried out at moderate temperatures, if desired, and it avoids the strong hydrolytic conditions prevailing in boiling aqueous solutions of the hydrogen halides. It has been found that hydrogen chloride splits many arylsulfonamides under such conditions only with difficulty and its use is limited on this account. Although the use of hydrogen iodide often leads to more satisfactory results than does the use of hydrogen chloride, it is frequently impractical to employ it due to its high cost and to its strong reducing action. For these and other reasons, hydrogen bromide is the preferred agent when using an aliphatic acid medium.

However, the use even of hydrogen bromide and an aliphatic acid medium for the splitting of many arylsulfonamides has not proven satisfactory under the condition heretofore used. It is known that, following the procedures heretofore described using such reagents and when the free amine which is formed is of such character that it reacts readily with free bromine to form bromine substitution products, the amine is invariably recovered from the reaction mixture in the form of those bromine substitution products. For example, the splitting of benzenesulfonanilide with hydrogen bromide in a glacial acetic acid medium following the heretofore known procedures leads invariably to the formation of bromoanilines rather than to unbrominated aniline. This is often highly undesirable and the procedure is, therefore not generally applicable to the cleaving of the sulfonyl derivatives of such easily brominated amines. It is apparent that any improved procedure whereby the splitting of a sulfonyl derivative of an easily brominated aryl amine could be effected readily and which would avoid the formation of bromine substitution products of the aryl amine or of other hydrolytic or decomposition products thereof and provide for recovery of the free amine in unreacted form would be of great value.

It has now been found that the sulfonyl derivative of easily brominated aryl amines, can be split readily to remove the sulfonyl group and recover the amine in unbrominated form by mixing the sulfonyl derivative in an aliphatic acid medium with hydrogen bromide and a bromine acceptor. Under such condition, the reaction can be carried out to cleave the sulfonyl radical from the arylsulfonamide and the aryl amine invariably recovered in high yield and substantially free of bromine substitution products.

The arylsulfonamides which can be split by the process of the invention to recover an arylamine in unbrominated form are the N-arylsulfonamides having the generic formula

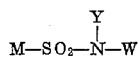

wherein M represents a hydrocarbon alkyl, aryl, aralkyl or cycloalkyl radical or a substitution product thereof wherein the substituent is non-reactive under the reaction conditions, Y represents hydrogen or a hydrocarbon alkyl, aralkyl or cycloalkyl radical or a substitution product thereof wherein the substituent is non-reactive under the reaction conditions and W represents an aromatic radical, a benzene nucleus of which is linked to the amido nitrogen and has at least one hydrogen atom easily replaceable with bromine.

Insofar as applicants are aware none of the the arylsulfonamides with which the process is concerned can be split or cleaved with hydrogen bromide in a substantially anhydrous aliphatic acid medium without the inclusion of a bromine acceptor in the reaction mixture and the amine recovered in unbrominated form. Sulfonamides other than those defined herein as arylsulfonamides can be cleaved by the process of the invention, but the use of a bromine acceptor is generally unnecessary and the invention is not concerned therewith.

The phase "easily replaceable with bromine" as applied herein to a hydrogen atom of a benzene nucleus of an aromatic radical means that the hydrogen atom is replaceable with bromine by the action of free bromine under the reaction conditions in the absence of a bromine acceptor. Such hydrogen atoms usually occupy a position ortho or para to the amido nitrogen. The term "easily brominatable aryl amine" refers to an amine containing a hydrogen atom easily replaceable with bromine.

The term "bromine acceptor" as used herein refers to a compound, usually a compound soluble in the reaction mixture, which is brominated by the action of free bromine in preference to the amine under the reaction conditions. Such compounds to fall within the scope of the definition must react with bromine under the reaction conditions more rapidly or with greater ease than does the free amine formed since both are present in the reaction mixture as soon as the cleavage of the aryl-sulfonamide has begun. Preferred bromine acceptors are the phenols, such as phenol, catechol, resorcinol, naphthol and monochlorophenol. Unsaturated compounds which absorb bromine easily can also be used if desired.

The reaction is carried out conveniently and easily by mixing an arylsulfonamide, hydrogen bromide and a bromine acceptor in an aliphatic acid medium and allowing the mixture to stand. The reaction usually proceeds at ordinary room temperature, although in some cases slowly, and is generally carried out at from about 0° to about 100° C. or higher. The reaction is usually substantially complete in from one to several hours and the aryl amine which is present in the mixture as its hydrobromide can then be separated from the mixture in any one of several ways. One convenient way of separating the arylamine consists in mixing the reaction mixture with sufficient ether to precipitate the amine hydrobromide. The hydrobromide can then be recovered by filtering the mixture. The hydrobromide can, if desired, be treated with an alkali, such as aqueous sodium bicarbonate, potassium carbonate, sodium hydroxide or the like, in conventional manner to liberate the free amine. Alternatively, the reaction mixture can be diluted with water, the acid neutralized and the amine extracted from the alkaline solution with a suitable solvent, such as ether or benzene. The reaction is generally carried out using at least 2.5 mols, preferably from about 5 to about 10 mols, of hydrogen bromide for each mol of arylsulfonamide. The use of a greater proportion of hydrogen bromide is generally not harmful but is uneconomical. Sufficient bromine acceptor is generally used to substantially prevent bromination of the amine, i. e., to react with all of the bromine which appears to be liberated during the reaction. It has been found that satisfactory results are obtained using sufficient bromine acceptor to react with at least 5, preferably with from about 5 to about 10, atoms of bromine for each molecule of arylsulfonamide in the mixture, although this will vary somewhat, depending upon the particular arylsulfonamide used. The reaction is preferably carried out under substantially anhydrous condition. The presence in the reaction mixture of a small proportion of water, such as that occurring in somewhat impure reagents or that which may be formed during the reaction is however, not harmful in most cases. It is preferred, however, to keep the water content of the reaction mixture as low as possible.

The process of the invention is applicable to the cleaving of a wide variety of arylsulfonamides falling within the scope of the generic formula given. In the formula given, alkyl, cycloalkyl and aralkyl radicals and substitution products thereof represented by M and Y can include the methyl, ethyl, n-butyl, iso-butyl, amyl, dodecyl, beta-chloroethyl, beta-nitroethyl, bromoethyl, beta-carboxyethyl, chlorododecyl, phenylmethyl, tolylmethyl, beta - tolylethyl, phenyl-iso-propyl, o-chlorotolylmethyl, p-carboxyphenylmethyl, nitrophenylmethyl, aminophenylmethyl, aminophenylethyl, chlorophenyldodecyl, methylcyclohexylmethyl, chlorocyclohexylethyl, nitrocyclohexylbutyl, cyclohexyl, chlorocylohexyl, carboxycyclohexyl, 3-chloro-2-bromopropyl, 3-bromo-2-chloropropyl, 3 - formoxy-2-chloropropyl, 3-acetoxy-2-chloropropyl, 3-benzoxy - 2 - bromopropyl, 3 - phenoxy - 2 - chloropropyl, 3 - chloro - 2 - acetoxypropyl, 3 - methoxy-2-formoxypropyl, 2,3-diacetoxypropyl, 3-chloro-2-ketopropyl, 3-bromo-2-ketopropyl, 3-formoxy-2-ketopropyl, 3-acetoxy-2-ketopropyl, 3 - benzoxy - 2 -ketopropyl, 3 - phenoxy - 2 - ketopropyl, 2,3-dibromoallyl and (2-amino-4-hydroxy-6-pteridyl)methyl radicals as well as many others. Generally speaking, the substituted hydrocarbon radicals represented by M will be limited by practical considerations to those containing less complex substituents, such as halogen and the nitro and carboxy radicals, due to the difficulty of preparing the compounds. However, insofar as applicants are aware, the arylsulfonamides containing more complex substituents, such as those just mentioned, in the group represented by M of the generic formula given which can be prepared can be cleaved in the manner described to give results in entire accord with those described in the description and appended examples. Aryl and substituted aryl radicals also represented by M of the generic formula given include the phenyl, p-tolyl, o-tolyl, xylyl, naphthyl, o-chlorophenyl, m-chlorophenyl, p-chlorophenyl, nitrophenyl, p-carboxyphenyl, chloronaphthyl, acetylaminophenyl, bromophenyl, iodophenyl, fluorophenyl radicals and many others.

Aromatic radicals which are represented by W of the generic formula given include, as indicated previously, aromatic radicals wherein a benzene nucleus is attached to the amido nitrogen atom and wherein the benzene nucleus also has at least one hydrogen atom easily replaceable with bromine. The aromatic radicals include those containing a benzene nucleus as well as the naphthyl and other carbocyclic and heterocyclic fused ring systems and can also comprise a wide variety of substituents on the benzene nucleus or other parts of a fused ring system of which the benzene nucleus may be a part. Such substituents include chloride, bromine, iodine, fluorine and the amino, nitro, carboxy and other substituents non-reactive under the reaction conditions. More complex substituents than those just mentioned can also be present in the aromatic radical. Thus, there may be present such substituents as the phenyl, carboxyphenyl, carboxyethyl, chloroethyl, and many other non-oxocarbonylic-containing radicals, such as amido and ester radicals. One group of preferred aromatic radicals of such complex nature comprises the amides derived from the carboxyl radical of p-aminobenzoic acid and the amino group of glutamic acid or its esters as well as similar radicals having a plurality of glutamic acid residues in the molecule connected through the gamma-carboxyl groups to form peptide linkages.

Arylsulfonamides which can be cleaved by the process of the invention to form aryl amines without bromination thereof include p-toluenesulfonanilide, N-methyl-p-toluene-sulfonanilide, ethyl N-(p-toluenesulfonyl)-p-aminobenzoate, m-nitrobenzenesulfananilide, beta-naphthalenesulfonanilide, methylsulfonanilide, beta-chloroethylsulfontoluidide, cyclohexylsulfonanilide, p-toluenesulfonyl-p-aminobenzoic acid, butyl p-toluenesulfonyl-p-aminobenzoate and many others. Arylsulfonylamides having more complex aromatic radicals attached to the amido nitrogen atom include the N'-(N-((2-amino-4-hydroxy-6-pteridyl)-methyl)-p-aminobenzoate compounds, certain of which are described and claimed in a concurrently filed co-pending application, Serial No. 41,882, and which can be represented by the generic formula

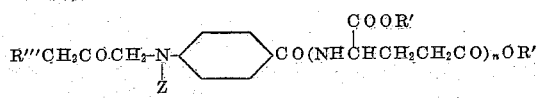

wherein R' is from the group consisting of hydrogen and the alkyl radicals, n is from the group consisting of zero and the positive integers 1 to 7, inclusive, and Z is an arylsulfonyl radical. These latter compounds upon treatment with hydrogen bromide and a bromine acceptor according to the process of the invention are cleaved to remove the sulfonyl radical and replace it with hydrogen to form unbrominated compounds identical with or closely related to pteroic acid and the folic acids.

Still other arylsulfonamides which can be cleaved to remove the sulfonyl radical and form a free amine without bromination thereof include (A) the N-(2-keto-propyl)-p-aminobenzoate compounds, certain of which are described and claimed in a concurrently filed co-pending application, Serial No. 41,889, and which have the formula

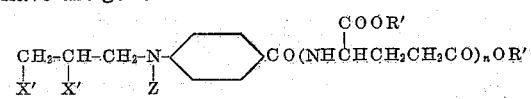

wherein R''' is from the group consisting of chlorine, bromine, iodine and the alkoxy, aryloxy, aralkoxy and acyloxy radicals, R' is from the group consisting of hydrogen and the alkyl radicals, n is from the group consisting of zero and the positive integers 1 to 7, inclusive, and Z is an arylsulfonyl radical; (B) the N-(2,3-dihalopropyl)-p-aminobenzoate compounds, certain of which are described and claimed in a concurrently filed copending application, Serial No. 41,886, and which have the generic formula

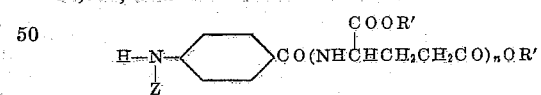

wherein R' is from the group consisting of hydrogen and the alkyl radicals, n is from the group consisting of zero and the positive integers 1 to 7, inclusive, Z is an arylsulfonyl radical and X' is from the group consisting of chlorine, bromine, and iodine; and (C) the N'-(arylsulfonyl-p-aminobenzoyl)-glutamic acid compounds, certain of which are described and claimed in a concurrently filed co-pending application, Serial No. 41,888, and which have the formula wherein R' is from the group consisting of hydrogen and the alkyl radicals, n is from the group consisting of the integers 1 to 7, inclusive, and Z is an arylsulfonyl radical.

Among the arylsulfonamides containing complex substituents on the benzene nucleus of the aromatic radical and, in some instances, more complex radicals on the amido nitrogen represented by Y of the generic formula given, are included N'-(p-toluenesulfonyl-p-aminobenzoyl)-l-glutamic acid, ethyl N-(3-benzoxy-2-ketopropyl)-p-toluenesulfonyl-p-aminobenzoate, diethyl N'-(p-toluenesulfonyl-p-aminobenzoyl)-l-glutamate, N-(3-chloro-2-ketopropyl)-p-toluenesulfonyl-p-aminobenzoic acid, ethyl N-(3-chloro-2-ketopropyl)-p-toluenesulfonyl-p-aminobenzoate, ethyl N-(3-formoxy-2-ketopropyl)-p-toluenesulfonyl-p-aminobenzoate, N-(3-methoxy-2-ketopropyl)-p-toluenesulfonyl-p-aminobenzoic acid, N-(3-phenoxy-2-ketopropyl)-p-toluenesulfonyl-p-aminobenzoic acid, diethyl N' - (N - (3 - chloro - 2 - ketopropyl) - p - toluenesulfonyl - p - aminobenzoyl) - glutamate, N' - (N - (3 - chloro - 2 - ketopropyl) - p - toluenesulfonyl - p - aminobenzoyl) - glutamic acid, diethyl N' - (N - (3 - formoxy - 2 - ketopropyl) - p - toluenesulfonyl - p - aminobenzoyl) - glutamate, diethyl N' - (N - (3 - acetoxy - 2 - ketopropyl) - p - toluenesulfonyl - p - aminobenzoyl) - glutamate, diethyl N' - (N - (3 - phenoxy - 2 - ketopropyl) - p - toluenesulfonyl - p - aminobenzoyl - 1 - glutamate, diethyl N' - (N - (3 - methoxy - 2 - ketopropyl) - p - toluenesulfonyl - p - aminobenzoyl) - 1 - glutamate, N - ((2 - amino - 4 - hydroxy - 6 - pteridyl) methyl) - p - toluenesulfonyl - p - aminobenzoic acid, ethyl N - ((2 - amino - 4 - hydroxy - 6 - pteridyl) methyl) - p - toluenesulfonyl - p - aminobenzoate, N' - (N - ((2 - amino - 4 - hydroxy - 6 - pteridyl) methyl) - p - toluene sulfonyl - p - aminobenzoyl) - glutamic acid, diethyl N' - (N - ((2 - amino - 4 - hydroxy - 6 - pteridyl) methyl) - p - toluenesulfonyl - p - aminobenzoyl) - glutamate.

It should also be mentioned that, although the method of the present invention is concerned principally with the cleaving of compounds wherein the substituents of substituted hydrocarbon radicals which may be represented by M, Y or W of the generic formula given are non-reactive under the reaction conditions, the method is also applicable to the cleavage of sulfonyl radicals from arylsulfonamides containing substituted hydrocarbon radicals wherein the substituents are reactive under the reaction conditions without bromination of the amine formed. Furthermore, when such reaction of a substituent is desirable, e. g. the replacement of hydroxyl group attached to an aliphatic carbon atom with a bromine atom, it is usually possible to adjust the reaction conditions so as to favor the concurrent progress of the reaction of the substituent and of the cleavage of the sulfonyl radical. On the other hand, a substituent which is reactive under certain reaction conditions is often substantially non-reactive under other conditions and, by altering the reaction conditions accordingly, it is often possible either to carry out the reaction involving the substituent concurrently with the cleavage of the sulfonyl radical or to supress it substantially completely without interferring unduly with the cleavage of the sulfonyl radical. A particular substituent in a particular position in an arylsulfonamide may thus be termed reactive under certain reaction conditions and non-reactive under other reaction conditions, both of which conditions favor the cleavage of the sulfonyl radical from the arylsulfonamide. It is, also, usually possible to protect a reactive substituent with a readily removable group to convert it to a substantially non-reactive substituent and then, following the cleaving of the sulfonyl radical, to remove the protecting group.

Certain advantages of the invention are apparent from the following examples which are given by way of illustration only and are not to be construed as limiting.

*Example 1.—Cleavage of p-toluenesulfonanilide*

A mixture of 2.5 grams of p-toluenesulfonanilide, 2 grams of phenol, and 23.2 grams of a 28 per cent solution of hydrogen bromide in glacial acetic acid was shaken in a stoppered flask until a uniform solution was obtained. The solution was allowed to stand at room temperature for three hours and then poured into 150 milliliters of vigorously agitated anhydrous ether. Crystals of aniline hydrobromide which separated were recovered by centrifuging. The crystals were suspended in 100 milliliters of ether and the mixture centrifuged. After drying, the crystals weighed 0.96 gram and melted at 283° C. (Dec.) Acetylation of the aniline hydrobromide by the Schotten-Baumann method gave acetanilid melting at 114° C.

In another determination carried out in identical manner with that just described except that the reacting mixture was allowed to stand ten hours instead of three hours, a yield of 70 per cent of the theoretical amount of aniline hydrobromide was obtained.

In a comparative determination, the procedure described was repeated except that the solution of hydrogen bromide in acetic acid was replaced with 30 milliliters of a 30 per cent solution of hydrogen chloride in glacial acetic acid. The mixture was allowed to stand for several hours but no aniline hydrochloride could be obtained from the reaction product. Most of the p-toluenesulfonanilide was recovered unchanged.

In still another comparative determination, the solution of hydrogen bromide in acetic acid was replaced with a 30 per cent solution of hydrogen iodide in acetic acid and the phenol was omitted from the mixture. The mixture rapidly became almost black but there was obtained from the mixture 1.71 grams, or 77 per cent of the theoretical amount, of aniline hydriodide.

In yet another comparative determination, p-toluenesulfonanilide was treated with an acetic acid solution of hydrogen bromide as described previously but without the addition of phenol. There was thus obtained a 48 per cent yield of the hydrobromides of dibromo- and tribromoanilines.

*Example 2.—Cleavage of p-toluenesulfonanilide*

A mixture of 2.5 grams of p-toluenesulfonanilide, 2 grams of phenol and 28 milliliters of a 28.5 per cent by weight solution of hydrogen bromide in pelargonic acid was agitated gently for about one hour at the end of which time all of the solid material had dissolved. The mixture was then allowed to stand for 6.5 hours during which time crystals separated from the solution. The mixture was then poured into three times its volume of dry ether and the crystals recovered by filtering and washing thoroughly with ether. After drying, there was obtained 1.41 grams, or 81 per cent of the theoretical amount, of pure aniline hydrobromide.

*Example 3.—Cleavage of ethyl N-(p-toluenesulfonyl) -p-aminobenzoate*

A mixture of 3.2 grams of ethyl N-(p-toluenesulfonyl)-p-aminobenzoate, 2 grams of phenol and 23.2 grams of a 28 per cent by weight solution of hydrogen bromide in glacial acetic acid was agitated until all of the solid material had dissolved and finally allowed to stand for five days. The mixture was then poured into dry ether and the crystals which separated were recovered by filtering, washing with ether and drying. There was thus obtained 2.4 grams, or 97 per cent of the theoretical amount, of ethyl p-aminobenzoate hydrobromide melting at 194° C. (Dec.). When mixed with an authentic sample of ethyl p-aminobenzoate hydrobromide, the mixture melted at 192° to 194° C. (Dec.). Acetylation of the product with acetic anhydride gave an acetate melting at 101° to 102° C.

Example 4.—Cleavage of N-methyl-p-toluenesulfonanilide

A mixture of 2.47 grams of N-methyl-p-toluenesulfonanilide, 2 grams of phenol and 20 milliliters of a 30 per cent solution of hydrogen bromide in glacial acetic acid was allowed to stand for three hours at room temperature and then poured into 200 milliliters of dry ether. Upon filtering the mixture and washing the solid residue with ether and subsequently drying the crystals, there was obtained 0.6 gram, or 33.8 per cent of the theoretical amount, of N-methyl-aniline hydrobromide. When the determination was repeated and the mixture allowed to stand for seven hours before pouring into ether, the yield was increased to 1.16 grams, or 65.2 per cent of the theoretical amount.

Example 5.—Cleavage of N-methyl-p-toluenesulfonanilide

A mixture of 2.47 grams of N-methyl-p-toluenesulfonanilide, 2.88 grams of beta-naphthol and 20 milliliters of a 30 per cent solution of hydrogen bromide in glacial acetic acid was stirred at room temperature for five hours. The solution was then poured into 200 milliliters of dry ether and after cooling to 10° C. the crystalline precipitate was recovered by filtering, washing with dry ether and drying. There was thus obtained 0.87 gram, or 49.0 per cent of the theoretical amount of N-methyl-aniline hydrobromide. The hydrobromide was acetylated with acetic anhydride and 20 per cent potassium hydroxide solution in conventional manner. The N-acetyl-N-methyl-aniline obtained melted, after recrystallization, at 97° to 100° C. and did not depress the melting point of an authentic sample of N-acetyl-N-methyl-aniline.

Example 6.—Cleavage of N-methyl-p-toluenesulfonanilide

A mixture of 2.47 grams of N-methyl-p-toluenesulfonanilide, 2.2 grams of catechol and 20 milliliters of a 30 per cent solution of hydrogen bromide in glacial acetic acid was stirred at room temperature for about five hours and then poured into 200 milliliters of dry ether. Upon filtering the mixture and washing the crystals with dry ether, there was obtained 0.94 gram, or 53 per cent of the theoretical amount, of N-methylaniline hydrobromide.

Example 7.—Cleavage of meta-nitrobenzenesulfonanilide

A mixture of 2.64 grams of meta-nitrobenzenesulfonanilide, 2 grams of phenol and 20 milliliters of a 30 per cent solution of hydrogen bromide in glacial acetic acid was agitated thoroughly until all of the solid material had dissolved and then allowed to stand at room temperature for three hours. The mixture was then poured into 150 milliliters of dry ether and the crystals which separated were recovered by filtering, washing with ether and drying. There was thus obtained 0.33 gram, or 19 per cent of the theoretical amount, of aniline hydrobromide. In a duplicate experiment, the mixture was allowed to stand for seven hours before pouring into ether and there was thus obtained 0.69 gram, or 39.6 per cent of the theoretical amount of aniline hydrobromide.

Example 8.—Cleavage of beta-naphthylenesulfonanilide

A mixture of beta-naphthylenesulfonanilide, phenol and 30 per cent hydrogen bromide in acetic acid was prepared substantially as by the method described in Example 7 and the mixture allowed to stand for three days at room temperature. The mixture was then poured into ether and the precipitate recovered by filtering, washing with ether and drying. There was thus recovered 32 per cent of the theoretical amount of aniline hydrobromide.

Example 9.—Cleavage of methanesulfonanilide

A mixture of 1.71 grams of methanesulfonanilide, 2 grams of phenol and 26 milliliters of a 24.6 per cent solution of hydrogen bromide in glacial acetic acid was prepared and allowed to stand for 6.5 hours at room temperature. The mixture was then poured into 200 milliliters of dry ether and the crystals which separated were recovered by filtering, washing with ether and drying. There was thus obtained 0.12 gram, or 7 per cent of the theoretical amount, of aniline hydrobromide. An identical reaction mixture was prepared and allowed to stand for 15.5 hours before it was poured into ether and the hydrobromide recovered. In this instance there was recovered 0.37 gram, or 21.2 per cent of the theoretical amount, of aniline hydrobromide.

Example 10.—Cleavage of p-nitrobenzenesulfonanilide

A mixture of 1.32 grams of p-nitrobenzenesulfonanilide, 1 grams of phenol and ten milliliters of a 26 per cent solution of hydrogen bromide in glacial acetic acid was stirred at room temperature for seven hours. The mixture was then poured into 30 milliliters of anhydrous ether and the precipitate which formed was recovered by filtering, washing with ether and drying. There was thus obtained 0.59 gram, or 67.9 per cent of the theoretical amount of aniline hydrobromide.

Example 11. — Ethyl N-(3-chloro-2-hydroxypropyl)-p-toluenesulfonyl-p-aminobenzoate A mixture of 5 grams of ethyl p-toluenesulfonyl-p-aminobenzoate and 3.4 milliliters of epichlorohydrin was heated at 135° C. and two drops of pyridine added. A vigorous action ensued and after 5 minutes the mixture was cooled, dissolved in 50 milliliters of ethanol and treated 3 times with decolorizing carbon. The ethyl N-(3-chloro-2-hydroxypropyl)-p-toluenesulfonyl-p-aminobenzoate which remained upon volatilization of the ethanol and excess epichlorohydrin in vacuo was used in subsequent reactions without further purification.

Example 12.—Ethyl N-(3-chloro-2-ketopropyl)-p-toluenesulfonyl-p-aminobenzoate The crude oily ethyl N-(3-chloro-2-hydroxypropyl)-p-toluenesulfonyl-p-aminobenzoate prepared from 30 grams of ethyl-p-toluenesulfonyl-p-aminobenzoate and an excess of epichlorohydrin was dissolved in 150 milliliters of acetic acid and a mixture of 12 grams of sodium dichromate, 10 milliliters of sulfuric acid, 45 milliliters of water and 60 milliliters of acetic acid was added over a period of three hours while maintaining the mixture at 5° C. After stirring for an additional three hours, the oxidization mixture was diluted with water and extracted with ether. The ethereal extract was washed with sodium bicarbonate and the ether distilled. The residue of ethyl N-(3-chloro-2-ketopropyl)-p-toluenesulfonyl-p-aminobenzoate crystallized from dilute ethanol on prolonged standing. The crystallized product weighed 5.5 grams and after two crystallizations from dilute ethanol, melted at 106° to 113° C.

Anal. Calcd. for $C_{19}H_{20}O_5NSCl$:
C, 55.7; H, 4.9; Cl, 8.7
Found:
C, 56.0; H, 4.9; Cl, 6.1

*Example 13.—Cleavage of ethyl N-(3-chloro-2-ketopropyl)-N-(p-toluenesulfonyl) - p-aminobenzoate*

A mixture was prepared consisting of 0.5 gram of ethyl N-(3-chloro-2-ketopropyl)-N-(p-toluenesulfonyl)-p-aminobenzoate, 0.235 gram of phenol and 5 milliliters of a 25 per cent solution of hydrogen bromide in glacial acetic acid. The mixture was allowed to stand for 2 hours at room temperature and then poured into 40 milliliters of dry ether. The mixture was filtered and the crystalline residue washed with dry ether and then dried. There was thus obtained ethyl N-(3-chloro-2-ketopropyl)-p-aminobenzoate hydrobromide. This product, when condensed with 2,4,5-triamino-6-hydroxypyrimidine, yielded a product having a marked activity for *Streptococcus fecalis* R.

*Example 14.—Diethyl N'-(p-toluenesulfonyl-p-aminobenzoyl)-l-glutamate*

A mixture of 407 grams of p-toluenesulfonyl-p-aminobenzoic acid and 3,450 milliliters of toluene was dried by distilling the mixture until 350 milliliters of distillate had been collected. A few drops of pyridine and 50 milliliters of thionyl chloride were then added to the dry toluene solution and the mixture stirred and refluxed for one-half hour. The solution was then cooled with agitation for two hours and the solid which precipitated was recovered by filtering and washing with toluene and then with mixed hexanes and drying. There was thus obtained 387 grams of p-toluenesulfonyl-p-aminobenzoyl chloride melting at 141° to 142° C.

A mixture of 48 grams of diethyl l(+)-glutamate hydrochloride, 68 grams of p-toluenesulfonyl-p-aminobenzoyl chloride, 19 grams of magnesium oxide, 250 milliliters of ethylene dichloride and 100 milliliters of water was stirred with cooling for about 4 hours. The mixture was filtered and the organic layer was separated from the filtrate and washed successively with water, ice cold dilute hydrochloric acid, water and dilute aqueous sodium bicarbonate. The washed organic layer was then dried and diluted with mixed hexanes until slightly turbid and allowed to crystallize. Upon filtering the mixture, there was obtained 78 grams of diethyl N'-(p-toluenesulfonyl-p-aminobenzoyl)-l-glutamate melting at 125° to 126° C. and having a specific rotation of $(a)_D^{25} = -13.2°$ in a mixture of 5 per cent methanol and 95 per cent ethanol.

*Example 15.—Cleavage of diethyl N'-(p-toluenesulfonyl-p-aminobenzoyl)-glutamate*

A mixture of 4.77 grams of diethyl N'-(p-toluenesulfonyl-p-aminobenzoyl)-glutamate and 2 grams of phenol was added to 23.5 grams of a 28 per cent solution of hydrogen bromide in glacial acetic acid. The solid material dissolved rapidly and the mixture was allowed to stand at room temperature for seventeen hours. The solution was then poured into 175 milliliters of anhydrous ether and the mixture centrifuged. The precipitated oil was triturated once with ether and then dissolved in 75 milliliters of water. The solution was neutralized with sodium bicarbonate and extracted with chloroform. Evaporation of the chloroform from the extract gave a residue of 1.35 grams of crystalline diethyl N'-(p-aminobenzoyl)-glutamate which, after recrystallization from alcohol, melted at 142° to 143° C. A mixed melting point with an authentic sample was unchanged.

*Example 16.—Diethyl N' - (N - (3-chloro - 2 - hydroxypropyl) -p-toluenesulfonyl - p-aminobenzoyl)-glutamate*

A mixture of 2.85 grams of diethyl N'-(p-toluenesulfonyl-p-aminobenzoyl)-glutamate and 1.1 grams of epichlorohydrin was agitated at 135° C. Two drops of pyridine were added and agitation at 135° C. was contained for five minutes. The excess epichlorohydrin was volatilized under reduced pressure. The residue which consisted of diethyl N'-(N-(3-chloro-2-hydroxypropyl)-p-toluenesulfonyl-p-aminobenzoyl)-glutamate was used in subsequent experiments without further purification. Diethyl N'-(N-(3-bromo - 2 - hydroxypropyl)-p - toluenesulfonyl - p - aminobenzoyl)-glutamate is prepared in similar fashion using epibromohydrin instead of epichlorohydrin.

Ethyl N-(3-chloro-2-hydroxypropyl)-p-toluenesulfonyl-p-aminobenzoate and N-(3-chloro-2-hydroxypropyl)-p-toluenesulfonyl - p - aminobenzoic acid are prepared in similar manner using ethyl p-toluenesulfonyl-p-aminobenzoate and p-toluenesulfonyl-p-aminobenzoic acid, respectively, instead of N'-(p-toluenesulfonyl-p-aminobenzoyl)-glutamate.

*Example 17.—Diethyl N'-(N-(3-chloro - 2 - ketopropyl)-p-toluenesulfonyl - p - aminobenzoyl) glutamate*

The oily diethyl N'-(N-(3-chloro-2-hydroxypropyl) - p-toluenesulfonyl - p - aminobenzoyl) - glutamate prepared from 2.85 grams of diethyl N'-(p - toluenesulfonyl-p-aminobenzoyl) - glutamate and an excess of epichlorohydrin was dissolved in 10 milliliters of glacial acetic acid. A mixture of 0.8 gram of chromic anhydride, 18 milliliters of glacial acetic acid and 1 milliliter of water was added slowly with stirring and cooling. The mixture was allowed to stand at room temperature for twelve hours and the acetic acid then volatilized under reduced pressure. The residue was taken up in a mixture of water and ether and the layers separated. The ether layer was washed with water until the washings were no longer green and then treated with charcoal and dried over anhydrous magnesium sulfate. Upon distillation of the ether, there remained diethyl N' - (N-(3-chloro-2-ketopropyl)-p-toluenesulfonyl-p-aminobenzoyl) - glutamate as a pale yellow viscous oil.

Ethyl N - (3-chloro-2-ketopropyl)-p-toluenesulfonyl-p-aminobenzoate and N-(3-chloro-2-ketopropyl)-p-toluenesulfonyl - p - aminobenzoic acid are prepared in similar fashion using ethyl N - (3-chloro-2-hydroxypropyl) - p - toluenesulfonyl-p-aminobenzoate and N-(3-chloro-2-hydroxypropyl)-p-toluenesulfonyl-p - aminobenzoic acid, respectively, instead of diethyl N'-(N-(3-chloro - 2 - hydroxypropyl)-p-toluenesulfonyl-p-aminobenzoyl)-glutamate.

*Example 18.—Diethyl N'-(N - ((2-amino-4-hydroxy-6-pteridyl) methyl) - p - toluenesulfonyl-p-aminobenzoyl)-l-glutamate*

Four hundred milligrams of diethyl N'-(N-(3-chloro-2-ketopropyl) - p-toluenesulfonyl-p-aminobenzoyl)-l-glutamate was added to a mixture of 100 milligrams of 2,4,5-triamino-6-hydroxypyrimidine, 120 milligrams of sodium acetate, 50 milliliters of potassium iodide and 15 milliliters of glacial acetic acid. The mixture was allowed to stand at room temperature for about one hour and then heated for 25 minutes on the steam bath. After standing overnight open to the air, the acetic acid was distilled at 50° C. under reduced pressure. The residue, after washing free of inorganic salts, contained a large proportion of diethyl N'-(N-((2-amino-4-hydroxy-6-pteridyl)methyl) - p-toluenesulfonyl - p - aminobenzoyl)-l-glutamate.

Ethyl N - ((2 - amino - 4 - hydroxy - 6 - pteridyl)methyl) - p - toluenesulfonyl - p - aminobenzoate and N - ((2 - amino - 4 - hydroxy - 6 - pteridyl)methyl) - p - toluenesulfonyl - p - aminobenzoic acid are prepared in similar manner using ethyl N - (3 - chloro - 2 - ketopropyl) - p - toluenesulfonyl - p - aminobenzoate and N - (3 - chloro - 2 - ketopropyl) - p - toluenesulfonyl - p - aminobenzoic acid, respectively, instead of diethyl N' - (N - (3 - chloro - 2 - ketopropyl) - p - toluenesulfonyl - p - aminobenzoyl) - l - glutamate.

*Example 19.—Cleavage of diethyl N' - (N -((2 - amino - 4 - hydroxy - 6 - pteridyl)methyl) - p - toluenesulfonyl - p - aminobenzoyl) - glutamate*

Crude diethyl N' - (N - ((2 - amino - 4 - hydroxy - 6 - pteridyl)methyl) - p - toluenesulfonyl - p - aminobenzoyl) - glutamate was dissolved in 3.5 milliliters of a 26 per cent solution of hydrogen bromide in glacial acetic acid containing a 0.13 gram of phenol. The mixture was stirred at room temperature for 1.5 hours and then stirred with 30 milliliters of anhydrous ether. The resulting mixture was filtered and the precipitate washed thoroughly with ether and dried in vacuo for several hours.

The dry precipitate consisting of crude diethyl N' - (N - ((2 - amino - 4 - hydroxy - 6 - pteridyl)methyl) - p - aminobenzoyl) - glutamate was hydrolyzed to form crude N' - (N - ((2 - amino - 4 - hydroxy - 6 - pteridyl)methyl) - p - aminobenzoyl) - glutamic acid. The free acid, upon micro-biological assay with *Streptococcus fecalis* R and with *Lactobacillus casei* had an activity of 44 per cent of that of the pure acid isolated from natural sources.

*Example 20.—Cleavage of ethyl N - ((2 - amino - 4 - hydroxy - 6 - pteridyl)methyl) - p - toluenesulfonyl - p - aminobenzoate*

The crude ethyl N - ((2 - amino - 4 - hydroxy - 6 - pteridyl)methyl) - p - toluenesulfonyl - p - aminobenzoate was dissolved in 3.5 milliliters of a 26 per cent by weight solution of hydrogen bromide in glacial acetic acid and 0.13 gram of phenol was added quickly. The mixture was stirred at room temperature for one hour and then poured into 30 milliliters of anhydrous ether. After mixing thoroughly and allowing to stand for a short time, the mixture of ether and suspended solid material was filtered and the residue washed twice with anhydrous ether and then dried in vacuo for several hours. The dry residue consisted of impure ethyl N - ((2 - amino - 4 - hydroxy - 6 - pteridyl)methyl) - p - aminobenzoate. The product was hydrolyzed with dilute sodium hydroxide convert the ester to the free acid. The product had an activity when bioassayed with *Streptococcus fecalis* R corresponding to a purity of 32 per cent of N - ((2 - amino - 4 - hydroxy - 6 - pteridyl)methyl) - p - aminobenzoic acid.

The procedure just described was repeated except that the reaction mixture was allowed to stand for five hours before being worked up with ether. The product obtained had an activity corresponding to 31 per cent pure pteroic acid.

The procedure was again repeated except that the reaction mixture was allowed to stand for 17 hours before being worked up with ether. The product obtained had an activity corresponding to that of 30 per cent pure pteroic acid.

The procedure was again repeated except that the amount of phenol used was reduced from 0.13 gram of 0.01 gram. The mixture was allowed to stand 5 hours before being worked up with ether. The product obtained had an activity corresponding to 16 per cent of that of pure pteroic acid.

The procedure was again repeated except that the phenol was omitted entirely from the reaction mixture. The mixture was allowed to stand 5 hours before being worked up with ether. The product obtained had an activity corresponding of that of pure pteroic acid.

*Example 21.—Cleavage of N-((2-amino-4-hydroxy-6-pteridyl)methyl) - p -toluenesulfonyl-p-aminobenzoic acid*

Crude N-((2-amino-4-hydroxy - 6 - pteridyl) - methyl) -p-toluenesulfonyl-p-aminobenzoic acid was dissolved in a mixture of 0.1 gram of phenol and 2.5 milliliters of 26 per cent solution of hydrogen bromide in glacial acetic acid. The mixture was stirred at room temperature for ninety minutes and the product recovered by adding the mixture to about 30 milliliters of ether and filtering. The solid material recovered consisting of crude N-((2-amino-4-hydroxy-6-pteridyl) methyl)-p-aminobenzoic acid was found after drying in vacuo to have a biological activity against *Streptococcus fecalis* R corresponding to 22 per cent of that of pure pteroic acid.

*Example 22.—Cleavage of N-(2,3-diacetoxypropyl)-p-toluenesulfonyl-p-aminobenzoic acid*

Twenty-six and four-teenths milliliters of a 30 per cent solution of hydrogen bromide in acetic acid was added to a mixture of 2.0 grams of phenol and 4.4 grams of N-(2,3-diacetoxypropyl)-p-toluenesulfonyl-p-aminobenzoic acid. The mixture was stirred for fifteen minutes at the end of which time it was a substantially homogeneous solution. The solution was allowed to stand at room temperature for 28 hours and then stirred into 200 milliliters of anhydrous ether. After refrigeration for one hour, the ether was decanted from the viscous liquid which had separated and the latter washed thoroughly with 100 milliliters of anhydrous ether. The decanted ether and the ethereal washings were combined and allowed to stand for several hours, at the end of which time yellow needle-like crystals had separated. These were recrystallized from a mixture of ether and acetic acid and there was thus obtained a product melting at 97° to 106° C. with decomposition and the evolution of gas. Analysis of the product indicated it to be a hydrobromide of N-(2,3-diacetoxypropyl)-p-aminobenzoic acid.

We claim:

1. The method for splitting a sulfonyl radical from an N-arylsulfonamide with hydrogen bromide to form an aromatic amine without bromination in the benzene nucleus thereof which includes the step of mixing the arylsulfonamide in an aliphatic acid medium with hydrogen bromide and a bromine acceptor selected from the class consisting of phenols and unsaturated compounds which absorb bromine easily in an aliphatic acid medium.

2. The method for splitting an N-arylsulfonamide which includes mixing hydrogen bromide and a bromine acceptor selected from the class consisting of phenols and unsaturated compounds which absorb bromine easily in an aliphatic acid medium with an arylsulfonamide having the formula

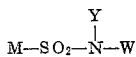

wherein M is from the group consisting of alkyl, aryl, aralkyl and cycloalkyl radicals and substitution products thereof wherein the substituents are non-reactive under the reaction conditions, Y is from the group consisting of hydrogen and alkyl, aralkyl and cycloalkyl radicals and substitution products thereof wherein the substituents are non-reactive under the reaction conditions, and W is an aromatic radical, the benzene nucleus of which is linked to the amido nitrogen and has at least one hydrogen easily replaceable with bromine, and, subsequently, separating from the reaction mixture an amine having the formula

3. The method for splitting an N-arylsulfonamide which includes mixing hydrogen bromide and a bromine acceptor selected from the class consisting of phenols and unsaturated compounds which absorb bromine easily in an aliphatic acid medium with an arylsulfonamide having the formula

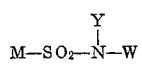

wherein M is from the group consisting of alkyl, aryl, aralkyl and cycloalkyl radicals and substitution products thereof wherein the substituents are non-reactive under the reaction conditions, Y is from the group consisting of hydrogen and alkyl, aralkyl and cycloalkyl radicals and substitution products thereof wherein the substituents are non-reactive under the reaction conditions, and W is an aromatic radical, the benzene nucleus of which is linked to the amido nitrogen and has at least one hydrogen easily replaceable with bromine, to replace the M—SO₂— radical thereof with hydrogen.

4. The method for splitting an N-arylsulfonamide which includes mixing hydrogen bromide and a bromine acceptor selected from the class consisting of phenols and unsaturated compounds which absorb bromine easily in an aliphatic acid medium with an arylsulfonamide having the formula

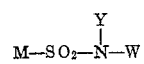

wherein M is from the group consisting of alkyl, aryl, aralkyl and cycloalkyl radicals and substitution products thereof wherein the substituents are non-reactive under the reaction conditions, Y is from the group consisting of hydrogen and alkyl, aralkyl and cycloalkyl radicals and substitution products thereof wherein the substituents are non-reactive under the reaction conditions, and W is an aromatic radical, the benzene nucleus of which is linked to the amido nitrogen and has at least one hydrogen easily replaceable with bromine, to cleave the molecule between the sulfur and nitrogen atoms and form an arylamine without bromination thereof.

5. The method of class 4 wherein M is an aryl radical.

6. The method of claim 4 wherein Y is hydrogen.

7. The method of claim 4 wherein W is a substituted phenyl radical.

8. The method of claim 4 wherein the aliphatic acid medium is acetic acid.

9. The method of claim 4 wherein the splitting is carried out under substantially anhydrous conditions.

10. The method of claim 4 wherein the splitting is carried out at a temperature between about 0° and about 100° C.

11. The method of claim 4 wherein the molecular ratio of hydrogen bromide to arylsulfonamide is at least 2.5.

12. The method of claim 4 wherein the bromine acceptor is a phenol.

13. The method which includes mixing hydrogen bromide and a bromine acceptor in an aliphatic acid medium with a compound having the formula

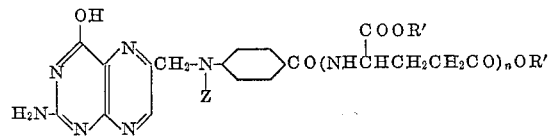

wherein R' is from the group consisting of hydrogen and the alkyl radicals, n is from the group consisting of zero and the positive integer 1, and Z is an arylsulfonyl radical, and separating from the reaction mixture a compound having the formula

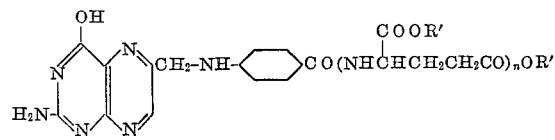

wherein n and R' have the values given.

14. The method of claim 13 wherein n is zero.

15. The method of claim 13 wherein n is the integer 1.

16. The method which includes mixing hydrogen bromide and a bromine acceptor selected from the class consisting of phenols and unsaturated compounds which absorb bromine easily in an aliphatic medium with a compound having the formula

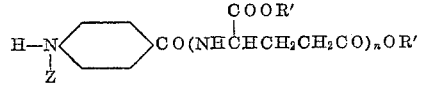

wherein R' is from the group consisting of hydrogen and the alkyl radicals, n is from the group consisting of zero and the positive integer 1, and Z is an arylsulfonyl radical, and separating from the reaction mixture a compound having the formula

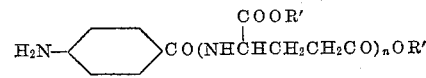

wherein n and R' have the values given.

DAVID I. WEISBLAT.
BARNEY J. MAGERLEIN.
DONALD R. MYERS.

REFERENCES CITED

The following references are of record in the file of this patent:

Lederle Bulletin, 13 (No. 3), 21, (1948).

Certificate of Correction

Patent No. 2,562,222                                                    July 31, 1951

DAVID I. WEISBLAT ET AL.

It is hereby certified that error appears in the printed specification of the above numbered patent requiring correction as follows:

Column 5, line 35, for "chloride" read *chlorine*; column 7, line 11, insert a closing parenthesis after "aminobenzoyl"; column 10, line 31, for "grams" read *gram*; line 68, for "oxidization" read *oxidation*; column 14, line 45, for "teenths" read *tenths*; column 16, line 1, for "class 4" read *claim 4*;

and that the said Letters Patent should be read as corrected above, so that the same may conform to the record of the case in the Patent Office.

Signed and sealed this 1st day of January, A. D. 1952.

[SEAL]

THOMAS F. MURPHY,
                                                                            *Assistant Commissioner of Patents.*